(12) United States Patent
Kobayashi et al.

(10) Patent No.: US 10,047,954 B2
(45) Date of Patent: Aug. 14, 2018

(54) METHOD FOR TREATING A WASTE USING A WASTE GASIFICATION MELTING FURNACE

(71) Applicant: NIPPON STEEL & SUMIKIN ENGINEERING CO., LTD., Tokyo (JP)

(72) Inventors: Atsushi Kobayashi, Fukuoka (JP); Yoshihiro Ishida, Fukuoka (JP); Hirohisa Kajiyama, Fukuoka (JP); Junichi Takada, Fukuoka (JP); Nobuhiro Tanigaki, Fukuoka (JP); Ryoh Makishi, Fukuoka (JP); Shoh Hirakura, Fukuoka (JP); Yasuka Fujinaga, Fukuoka (JP)

(73) Assignee: NIPPON STEEL & SUMIKIN ENGINEERING CO., LTD., Tokyo (JP)

( * ) Notice: Subject to any disclaimer, the term of this patent is extended or adjusted under 35 U.S.C. 154(b) by 707 days.

(21) Appl. No.: 14/372,319

(22) PCT Filed: Nov. 27, 2012

(86) PCT No.: PCT/JP2012/007596
§ 371 (c)(1),
(2) Date: Jul. 15, 2014

(87) PCT Pub. No.: WO2013/128524
PCT Pub. Date: Sep. 6, 2013

(65) Prior Publication Data
US 2014/0338575 A1 Nov. 20, 2014

(30) Foreign Application Priority Data

Feb. 28, 2012 (JP) ................................. 2012-041887

(51) Int. Cl.
*F23G 5/027* (2006.01)
*F23G 5/50* (2006.01)
(Continued)

(52) U.S. Cl.
CPC ............. *F23G 5/0276* (2013.01); *F23G 5/08* (2013.01); *F23G 5/24* (2013.01); *F23G 5/444* (2013.01);
(Continued)

(58) Field of Classification Search
CPC ..... F23G 5/04; F23G 5/05; F23G 5/14; F23G 5/16; F23G 5/165; F23G 5/38;
(Continued)

(56) References Cited

U.S. PATENT DOCUMENTS 4,109,590 A * 8/1978 Mansfield ............... C10B 49/04
110/165 R
4,471,704 A * 9/1984 John ....................... F23G 5/002
110/109
(Continued)

FOREIGN PATENT DOCUMENTS

| CA | 2185964 | 9/1996 |
|---|---|---|
| JP | 53-16633 | 6/1978 |

(Continued)

OTHER PUBLICATIONS

International Search Report dated Feb. 19, 2013 in International (PCT) Application No. PCT/JP2012/007596.
(Continued)

*Primary Examiner* — David J Laux
(74) *Attorney, Agent, or Firm* — Wenderoth, Lind & Ponack, L.L.P.

(57) ABSTRACT

A waste gasification and melting furnace that promotes the drying and pyrolytic decomposition of waste in the shaft section, making it possible to limit the conveyance of
(Continued)

moisture and volatile components to the bottom of the blast furnace and to reduce the consumption of extra coke. The waste gasification and melting furnace includes a shaft section; a melting furnace section; and a communicating section.

9 Claims, 8 Drawing Sheets

(51) Int. Cl.
    *F23G 5/08*         (2006.01)
    *F23G 5/44*         (2006.01)
    *F23G 5/24*         (2006.01)

(52) U.S. Cl.
    CPC .......... *F23G 5/50* (2013.01); *F23G 2202/101* (2013.01); *F23G 2202/20* (2013.01); *F23G 2203/101* (2013.01); *F23G 2204/101* (2013.01); *Y02E 20/344* (2013.01)

(58) Field of Classification Search
    CPC ............. F23G 2201/10; F23G 2201/40; F23G 2202/103; F23B 1/36
    See application file for complete search history.

(56) References Cited

U.S. PATENT DOCUMENTS

| | | | | |
|---|---|---|---|---|
| 5,081,940 A | * | 1/1992 | Motomura | F23G 5/085 110/165 R |
| 5,749,309 A | * | 5/1998 | Forsberg | C10B 7/04 110/230 |
| 6,182,584 B1 | * | 2/2001 | Gaudio | C10B 51/00 110/101 C |
| 2007/0284453 A1 | * | 12/2007 | Tsangaris | C10J 3/002 237/12 |
| 2009/0235851 A1 | * | 9/2009 | Krebs | F23B 30/10 110/347 |

FOREIGN PATENT DOCUMENTS

| | | |
|---|---|---|
| JP | 60-11766 | 3/1985 |
| JP | 9-126428 | 5/1997 |
| JP | 11-281032 | 10/1999 |
| JP | 2010-38535 | 2/2010 |
| JP | 2010-43840 | 2/2010 |
| JP | 2010-255888 | 11/2010 |
| JP | 2010-255890 | 11/2010 |
| JP | 2011-064382 | 3/2011 |
| JP | 2011-64383 | 3/2011 |
| JP | 2011-64411 | 3/2011 |

OTHER PUBLICATIONS

Extended European Search Report dated Oct. 12, 2015 in corresponding European Application No. 12869814.9.

International Preliminary Report on Patentability dated Sep. 2, 2014 in International (PCT) Application No. PCT/JP2012/007596.

* cited by examiner (a)

(b)

METHOD FOR TREATING A WASTE USING A WASTE GASIFICATION MELTING FURNACE

FIELD

The present invention relates to a waste gasification melting furnace that dries and pyrolyzes wastes charged through an upper portion of the furnace, further melts pyrolysis residues, and collects melting residues from a furnace bottom portion.

BACKGROUND

Examples of a method for treating a waste such as a general waste or an industrial waste may include a method with which a waste is melted in an industrial furnace by using a carbon-based solid fuel such as cokes as a melting heat source. The waste treatment by means of melting is advantageous not only in that the volume of wastes can be reduced but also in that incinerated ashes or non-combustible wastes, which previously would have been finally disposed by landfill, can be transformed to slags and metals for recycling.

A known facility for melting wastes is a shaft type gasification melting furnace (see Patent Literature 1 and Patent Literature 2, for example). The waste gasification melting furnaces disclosed in Patent Literatures 1 and 2 each include a furnace main body including a cylindrical shaft portion (an upright barrel portion), an inverted truncated cone portion (a pavilion portion), and a furnace bottom portion. The waste gasification melting furnaces each have an upper-stage tuyere and a lower-stage tuyere for blowing a combustion supporting gas such as air or oxygen-enriched air into the furnace.

According to the waste gasification melting furnaces disclosed in Patent Literatures 1 and 2, wastes and cokes are charged from an upper portion of the furnace and the wastes descending through the shaft portion are heat-exchanged with air blown from the upper-stage tuyere so as to dry and pyrolyze the wastes. The pyrolysis residues of the dried and pyrolyzed wastes descend to the furnace bottom portion to be melted with the combustion heat of the cokes being used as a heat source. Thereafter, the melting residues are drawn from the furnace bottom portion and slags and metals are collected.

According to the waste gasification melting furnaces disclosed in Patent Literatures 1 and 2, wastes are dried and pyrolyzed by air blown through the upper-stage tuyere. Therefore, in order to facilitate the drying and pyrolysis of the wastes, it is preferred to increase a percentage of oxygen to be supplied from the upper-stage tuyere by increasing a blast amount from the upper-stage tuyere, for example. By increasing the percentage of oxygen to be supplied from the upper-stage tuyere, the drying and pyrolysis by means of the combustion heat from the wastes themselves can be facilitated in the shaft portion.

According to the waste gasification melting furnaces disclosed in Patent Literatures 1 and 2, however, a blow-by phenomenon or the like is generated especially if the oxygen percentage from the upper-stage tuyere exceeds the majority, thereby resulting in an unstable operation of the furnace, for example, fluctuations in a pressure in the furnace as described also in the literatures. Thus, when actually operating the furnace, the oxygen percentage from the lower-stage tuyere is set at 70 to 80% and the oxygen percentage from the upper-stage tuyere is kept at 20 to 30%. In addition, the shaft-type gasification melting furnace has a configuration according to which air blown through the upper-stage tuyere is hard to reach a central region of the shaft portion. Therefore, wastes descending through the central region of the shaft portion are insufficiently dried and pyrolyzed, thereby increasing an amount of moisture content or volatile content to be carried over into the furnace bottom portion. As a result, some of the combustion heat from the cokes, serving as a melting heat source, is consumed for evaporating such moisture or volatile. An extra amount of cokes used for that purpose is therefore necessary to be provided. Such excess consumption of cokes leads to not only a problem of driving up the running cost thereof but also a problem of increasing $CO_2$ emissions generated from a fossil fuel.

CITATION LIST

Patent Literature

Patent Literature 1: Japanese Examined Patent Application Publication No. Sho. 53-16633
Patent Literature 2: Japanese Examined Patent Application Publication No. Sho. 60-11766

SUMMARY

Technical Problem

The present invention has been made in order to solve the above-described problems. It is an object of the present invention to provide a waste gasification melting furnace capable of: facilitating the drying and pyrolysis of wastes in a shaft portion; preventing moisture or volatile from being carried over into the bottom of the furnace; and reducing excess consumption of cokes.

It is another object of the present invention to prevent insufficiently-pyrolyzed wastes from being carried over into the furnace bottom by improving the pyrolysis efficiency of wastes and to thereby reduce the combustion load at the furnace bottom.

Solution to Problem

More specifically, the gist of the present invention is as follows.

(1) A waste gasification melting furnace comprising: a shaft portion configured to dry and pyrolyze wastes charged into the shaft portion, the shaft portion having a waste charging port and a furnace gas exhaust port provided on an upper side of the shaft portion and an opening on a bottom side of the shaft portion for discharging wastes; a melting furnace portion arranged in such a manner that a core of the melting furnace is shifted from a core of the shaft portion, the melting furnace portion having, on an upper side of the melting furnace, an opening through which pyrolyzed wastes and a carbon-based solid fuel are supplied, and having, on a furnace bottom side of the melting furnace, a tuyere through which oxygen-enriched air for combustion is blown into the melting furnace portion; and a communicated portion configured to connect between the bottom-side opening of the shaft portion and the upper-side opening of the melting furnace portion, wherein the communicated portion includes: a carbonizing grate portion disposed at a position where a load of the wastes charged in the shaft portion is received; a blower configured to blow air used for drying and pyrolysis into the shaft portion from the carbonizing grate portion; and a supply device configured to supply pyrolyzed wastes being on the carbonizing grate portion to the upper-side opening of the melting furnace portion, the carbonizing grate portion includes: a supply carbonizing grate disposed on an upper-stage side of the carbonizing grate portion; and a dry distillation carbonizing grate disposed on a lower-stage side of the carbonizing grate portion, the supply device includes: a first supply device for supplying wastes on the supply carbonizing grate toward the dry distillation carbonizing grate; and a second supply device for supplying carbonized wastes on the dry distillation carbonizing grate toward the melting furnace portion, and in order to facilitate drying and pyrolysis utilizing combustion heat from wastes themselves in the carbonizing grate portion, the air for drying and pyrolysis is blown into the shaft portion from the carbonizing grate portion in such a manner that the air contains 60% or more of a total amount of oxygen to be blown into the furnace; oxygen delivery to be supplied from the tuyere in the melting furnace portion is set to be less than 40% of the total amount of oxygen to be blown into the furnace; and a supply rate (V2) of the second supply device is set to be greater than a supply rate (V1) of the first supply device (V2>V1).

(2) The waste gasification melting furnace according to (1) described above, wherein the blower adjusts an amount of air to be blown into the furnace from the carbonizing grate portion in such a manner that a moisture content in wastes supplied from the carbonizing grate portion to the melting furnace portion is equal to or smaller than 10% and a remained amount of fixed carbons is equal to or greater than 3%.

(3) The waste gasification melting furnace according to (1) or (2) described above, wherein the supply rate of the supply device is controlled in such a manner that a waste charged height in the melting furnace portion is kept within a range between +0.5 m from the tuyere in an upward direction and a lowermost end of the carbonizing grate portion.

(4) The waste gasification melting furnace according to any one of (1) to (3) described above, wherein the supply rate of the supply device is controlled in such a manner that a differential pressure between a pressure (P1) in the melting furnace portion and a pressure (P2) in a space above the carbonizing grate portion is kept within a range between 0.4 kPa and 2 kPa.

(5) The waste gasification melting furnace according to any one of (1) to (4) described above, wherein the supply rate of the supply device is controlled in such a manner that a temperature in the carbonizing grate portion is kept within a range between 650° C. and 800° C.

(6) The waste gasification melting furnace according to any one of (1) to (5) described above, wherein with a value obtained by dividing a theoretical combustion oxygen amount (M1) of fixed carbons contained in the carbon-based solid fuel by a total oxygen amount (M2) of the oxygen-enriched air to be blown into the melting furnace from the tuyere being defined as a melting furnace fuel ratio (M1/M2) the melting furnace fuel ratio (M1/M2) is set within a range between 0.8 and 1.2.

(7) The waste gasification melting furnace according to any one of (1) to (6) described above, wherein one or more waste charging ports, used for changing a position at which charging wastes into the furnace is performed depending on a kind or property of wastes, are provided at a position different from the waste charging port disposed on the upper portion of the shaft portion.

(8) The waste gasification melting furnace according to any one of (1) to (7) described above, wherein a carbonizing grate combustion rate in the carbonizing grate portion falls within a range between 300 kg/($m^2$·h) and 500 kg/($m^2$·h).

(9) The waste gasification melting furnace according to any one of (1) to (8) described above, wherein the melting furnace portion has a cylindrical shape; an inverted truncated cone portion forming a narrowed portion is formed between the opening through which wastes from the carbonizing grate portion are supplied and the tuyere; and an inclination angle of the inverted truncated cone portion is greater than 75 degrees.

Advantageous Effects of Invention

According to the present invention, the carbonizing grate portion is disposed at the position where the load of wastes charged in the shaft portion is received; air used for drying and pyrolysis, which contains 60% or more of the total amount of oxygen to be blown into the furnace, is blown into the shaft portion through the carbonizing grate portion; oxygen delivery to be supplied from the tuyere in the melting furnace portion is set to be less than 40% of the total amount of oxygen to be blown into the furnace; and the rate (V2) at which the dry distillation carbonizing grates supply wastes to the melting furnace portion is set to be greater than the rate (V1) at which the supply carbonizing grates supply wastes to the dry distillation carbonizing grates (V2>V1). As a result, it becomes possible to facilitate the drying and pyrolysis of wastes in the shaft portion and the carbonizing grate portion while preventing a phenomenon such as the blow-by phenomenon, causing an unstable operation of the furnace, from occurring. Consequently, it becomes possible to prevent moisture or volatile from being carried over into the furnace bottom of the melting furnace portion, thereby reducing excess consumption of the carbon-based solid fuel.

Furthermore, according to the present invention, the amount of air to be blown into the furnace from the carbonizing grate portion is adjusted in such a manner that the moisture content in wastes supplied from the carbonizing grate portion to the melting furnace portion is equal to or smaller than 10% and the remained amount of fixed carbons is equal to or greater than 3%. Also, the amount of oxygen, corresponding to the adjusted amount of air, is set to be 60% or more of the total amount of oxygen for the entire furnace. As a result, without increasing the oxygen amount for the entire furnace even in comparison with the conventional technique, wastes can be supplied to the melting furnace portion after being made to have a property suitable for melting with a well-considered balance between the moisture and the residual fixed carbons. Consequently, an unnecessary combustion load other than melting can be reduced in the melting furnace portion more reliably, thereby suppressing excess consumption of the carbon-based solid fuel. Moreover, one of major advantageous effects of the present invention is that an oxygen generator can be downsized due to a significant reduction in the oxygen amount for the entire furnace and power consumption in the oxygen generator can be thereby significantly reduced.

Furthermore, according to the present invention, the carbonizing grate portion has a two-stage structure consisting of the supply carbonizing grates and the dry distillation carbonizing grates; and the rate (V2) of supplying wastes from the dry distillation carbonizing grates to the melting furnace portion is set to be greater than the rate (V1) of supplying wastes from the supply carbonizing grates to the dry distillation carbonizing grates. As a result, the thickness of a layer of wastes on the dry distillation carbonizing grates can be made thin, thereby improving the pyrolysis efficiency thereof.

Furthermore, according to the present invention, the supply rate from the carbonizing grate portion is controlled in such a manner that the waste charged height in the melting furnace is kept within a range between +0.5 m from the tuyere in the upward direction and the lowermost end of the carbonizing grate portion. Thus, the minimal charged height, capable of suppressing oxygen leakage from the melting furnace portion to the communicated portion, can be maintained. As a result, it becomes possible to prevent the occurrence of a reaction between the leaked oxygen and carbon monoxide existing in the communicated portion. It is further possible to prevent oxidation melt clinker from being formed on an inner wall of the furnace. In a reverse way, by setting the charged height at a position equal to or lower than the lowermost end of the carbonizing grate portion, it is possible to prevent a decrease in the pyrolysis efficiency in a space above the carbonizing grate portion and a bridging phenomenon resulting from being packed. In a case where the melting furnace portion has a cylindrical shape, the inverted truncated cone portion forming the narrowed portion is formed between the upper-side opening through which wastes are supplied and the tuyere. Also by setting the inclination angle of the inverted truncated cone portion to be greater than 75 degrees, the bridging can be prevented from occurring.

Furthermore, according to the present invention, with the value obtained by dividing the theoretical combustion oxygen amount (M1) of fixed carbons contained in a carbon-based solid fuel by the total oxygen amount (M2) of oxygen-enriched air to be blown into the melting furnace portion from the tuyere being defined as the melting furnace fuel ratio (M1/M2), the melting furnace fuel ratio (M1/M2) is set within a range between 0.8 and 1.2. As a result, it becomes possible to prevent excess air (or oxygen) from being supplied to the melting furnace portion while allowing the carbon-based solid fuel to be reached reliably up to the furnace bottom.

Furthermore, according to the present invention, it is configured to change the position at which charging into the furnace is performed depending on a kind or property of wastes. As a result, wastes having a low moisture content, wastes having a high ash content, or the like, for example, can be directly charged into the melting furnace portion, thereby preventing them from passing through the shaft portion. Consequently, it becomes possible to improve the efficiency of drying and pyrolysis in the shaft portion and the carbonizing grate portion. Moreover, an effect of reducing the amount of ashes fallen through gaps between the grates of the carbonizing grate portion can be expected.

Furthermore, according to the present invention, the carbonizing grate portion is configured in such a manner that the carbonizing grate combustion rate falls within the range between 300 kg/(m$^2$·h) and 500 kg/(m$^2$·h). As a result, wastes with a moisture content at 10% or smaller and a preferable remained amount of fixed carbons can be generated and then supplied to the melting furnace portion. The preferable remained amount of fixed carbons is equal to or greater than 3%.

DESCRIPTION OF EMBODIMENTS

A waste gasification melting furnace according to a preferred embodiment of the present invention will now be described below in detail with reference to the accompanying drawings. Note however that the technical scope of the present invention is not limited in any way by the embodiment to be described below.

Figure 1:
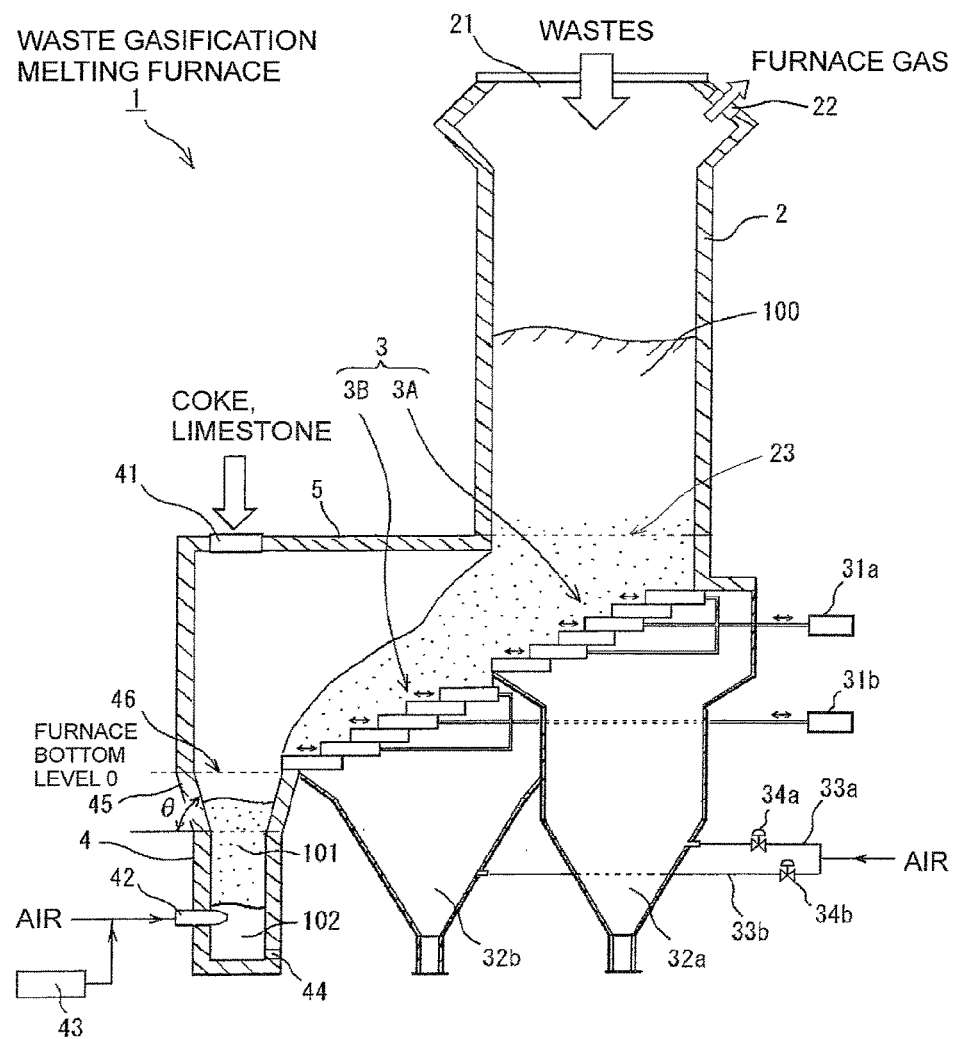
FIG. 1 is a longitudinal cross-sectional view illustrating a waste gasification melting furnace according to a preferred embodiment of the present invention.

FIG. 1 is a longitudinal cross-sectional view illustrating a waste gasification melting furnace according to the present embodiment. A waste gasification melting furnace 1 for example includes: a shaft portion 2 for drying and pyrolyzing wastes under a reducing atmosphere; a carbonizing grate portion 3 for producing carbonized wastes by means of further pyrolysis of the dried and pyrolyzed wastes; and a melting furnace portion 4 for further combusting and melting the carbonized wastes. The shaft portion 2 and the melting furnace portion 4 are arranged in such a manner that cores thereof are laterally shifted from each other. A bottom-side opening of the shaft portion 2 is connected to an upper-side opening of the melting furnace portion 4 via a communicated portion 5. The carbonizing grate portion 3 is arranged in a stair-like shape on a bottom surface side of the communicated portion 5.

The shaft portion 2 is formed in a cylindrical shape, for example. A waste charging port 21 for charging wastes, i.e., an object to be treated, into a furnace is formed on an upper portion of the shaft portion 2. Also, a furnace gas exhaust port 22 for discharging a gas generated by the pyrolysis of wastes or a gas blown into the furnace is formed on an upper portion of the cylindrical shaft portion. The bottom surface of the cylindrical shaft portion 2 defines an opening 23 for discharging wastes descending through the shaft under their own weights. An inner diameter and a height of the shaft portion 2 can be appropriately determined depending on the treatment capacity of the furnace and the like. However, the height thereof is preferably set to a height allowing a waste charged height in the shaft to be controlled at least at 1 m or greater from the lower end surface thereof. By keeping the charged height at 1 m or greater, the blow-by phenomenon of the furnace gas can be prevented from occurring in the shaft.

The melting furnace portion 4 is formed in a cylindrical shape, for example. A secondary material charging port 41 for charging a carbon-based solid fuel into the furnace is formed on an upper portion of the melting furnace portion 4. Also, a plurality of tuyeres 42 for allowing oxygen-enriched air to be blown into the furnace are arranged in a circumferential direction thereof in the furnace bottom of the melting furnace portion 4 in order to combust the charged carbon-based solid fuel and combustible pyrolysis residues (fixed carbons) of the carbonized wastes supplied from the carbonizing grate portion 3. The oxygen-enriched air blown into the furnace from the tuyeres 42 refers to air whose oxygen concentration is increased by mixing with oxygen from an oxygen generator 43, for example. Note that the carbon-based solid fuel may be charged from the waste charging port 21 together with wastes. The carbon-based solid fuels refer to cokes or carbides of biomasses. However, other carbon-based combustible material can be used instead. Besides the carbon-based solid fuel, limestone serving as a basicity modifier, or the like, can also be charged through the secondary material charging port 41.

A tapping port 44 is provided in the furnace bottom of the melting furnace portion 4 so as to discharge melting residues (i.e., slags and metals). The tapping port 44 is provided with an opening and closing mechanism (not shown) and intermittently discharges the melting residues. The melting residues discharged out from the furnace are cooled and solidified and then separated into slags and metals. In a case where the melting residues are intermittently discharged under a reducing atmosphere as described above, the slag temperature at the furnace bottom (what is actually measured is the temperature of the melting residue) is preferably at 1450° C. or greater. If the slag temperature is at 1450° C. or greater, a high-quality slag with a low content of lead (Pb) can be obtained. Moreover, the slag can be discharged out from the furnace in a stable manner since the fluidity thereof is excellent. Thus, in the melting furnace of the present embodiment, the slag temperature at the furnace bottom is preferably at 1450° C. or greater in order to achieve a stable operation of the furnace.

The melting furnace portion 4 preferably includes an inverted truncated cone portion (what is called a pavilion portion) 45 forming a narrowed portion between a connected position with the communicated portion 5 (i.e., the lowermost end of the carbonizing grate portion 3) and the tuyeres 42. It is also preferred to set an inclination angle θ of the inverted truncated cone portion 45 to be greater than 75 degrees. When the inclination angle θ of the inverted truncated cone portion 45 is equal to or smaller than 75 degrees, especially when it is equal to or smaller than 70 degree, the burden descent may be interrupted particularly due to a friction with a wall surface of the inverted truncated cone portion 45, resulting in the occurrence of the waste bridging phenomenon inside thereof. The inclination angle θ of the inverted truncated cone portion 45 is therefore set to be greater than 75 degrees so as to facilitate the burden descent of the charged material in the melting furnace portion 4 and thereby prevent the occurrence of the bridging phenomenon. If the melting furnace portion 4 is formed in a rectangular shape instead of the cylindrical shape, both of lateral faces of the furnace in a width direction thereof are made to have an inclination angle (θ) greater than 75 degrees as illustrated in FIG. 2.

The communicated portion 5 is formed in such a manner that the longitudinal cross-section thereof forms a rectangular shape. The communicated portion 5 includes the carbonizing grate portion 3 disposed along the bottom surface thereof. The carbonizing grate portion 3 further pyrolyzes the wastes having been dried and pyrolyzed in the shaft portion 2. According to the present embodiment, an amount of air is adjusted so that the inside of the furnace becomes a reducing atmosphere. While preventing the combustion thereof from proceeding and thereby producing ashes, the wastes are pyrolyzed (dry distillation) and carbonized. Furthermore, the carbonizing grate portion 3 functions as a device for performing the pyrolysis (dry distillation) of wastes and also functions as a supply device for supplying the carbonized wastes to the melting furnace portion 4. More specifically, the carbonizing grate portion 3 is formed by alternately combining a movable grate and a fixed grate in a stair-like shape or in a sloped manner. The carbonizing grate portion 3 is configured to reciprocate the respective movable grates back and forth with a constant pitch by means of drive units 31 (31a and 31b), such as fluid pressure cylinders, so as to stir the wastes positioned on the carbonizing grate portion 3 and push them out from the upstream side toward the downstream side. Note however that the carbonizing grate portion 3 may be configured only by the fixed grates and a supply device may be provided separately. An example of such a supply device is a pusher.

The carbonizing grate portion 3 has a two-stage structure consisting of supply carbonizing grates 3A positioned on an upper-stage side and dry distillation carbonizing grates 3B positioned on a lower-stage side. The supply carbonizing grates 3A are disposed at positions directly above which the shaft portion 2 is placed so as to directly receive the load of wastes charged into the shaft portion 2. The supply carbonizing grates 3A further pyrolyze and carbonize the wastes having been dried and pyrolyzed in the shaft portion 2 and push them out and supply them to the dry distillation carbonizing grates 3B. A width of the carbonizing grate portion 3, particularly a width of the supply carbonizing grates 3A, is preferably identical to the inner diameter of the shaft portion 2. It is possible to stabilize the burden descent of wastes by setting the width of the carbonizing grate portion 3 and the inner diameter of the shaft portion 2 to be identical to each other at a portion where the shaft portion 2 is changed into the carbonizing grate portion 3. Consequently, wastes can be prevented from being in a bridging state at the portion where the shaft portion 2 is changed into the carbonizing grate portion 3 or in the shaft portion 2.

Figure 2:
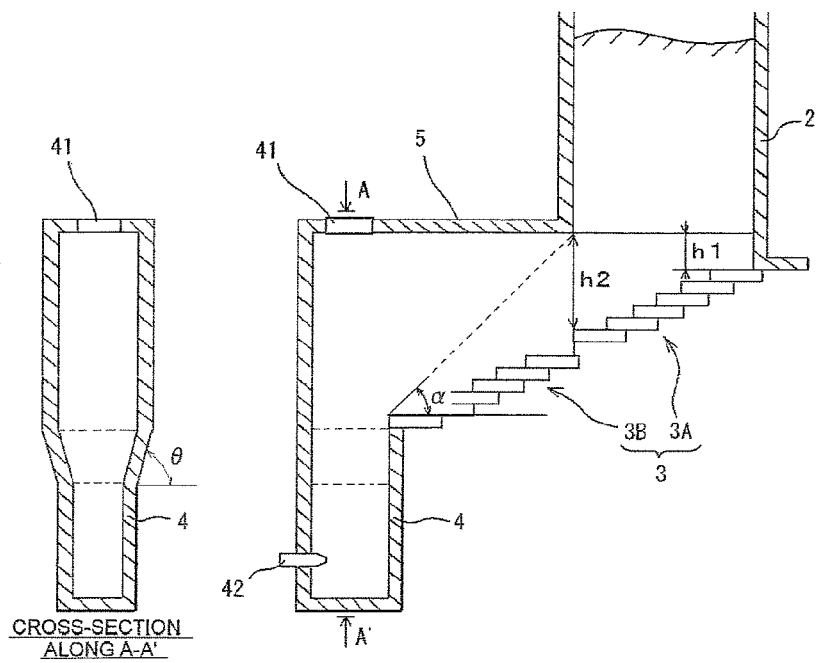
FIG. 2 is a diagram for explaining a shape of the waste gasification melting furnace.

Moreover, in order to prevent wastes around the lower end of the shaft portion 2 from being packed by the supplying operation of the supply carbonizing grates 3A in a downstream direction, the grate at the top stair of the supply carbonizing grates 3A is preferably disposed at a position lower than the lower end of the shaft portion 2 (i.e., a height h1>0) as illustrated in FIG. 2. Moreover, when the width of the supply carbonizing grates 3A is set to be identical to the inner diameter of the shaft portion 2, it is further preferable that a width (h2) between the lowermost end of the supply carbonizing grates 3A and the lower end of the shaft portion 2 be smaller than the inner diameter of the shaft portion 2 as illustrated in FIG. 2. With such a configuration, a flow velocity of a gas flowed into the shaft portion 2 from the communicated portion 5 is increased, thereby allowing the gas to be uniformly spread over in the shaft portion 2. When the width of the supply carbonizing grates 3A is set to be different from the inner diameter of the shaft portion 2, the cross-sectional area of the rectangle at the corresponding portion is set to be smaller than the cross-sectional area of the shaft instead of the height h2.

The dry distillation carbonizing grates 3B, on the other hand, further pyrolyze the wastes sent from the supply carbonizing grates 3A and generate carbides. The carbonized wastes are pushed out and supplied to the melting furnace portion 4. The dry distillation carbonizing grate 3B may have a width identical to or relatively different from that of the supply carbonizing grate 3A. Since a volume of wastes is reduced along with the development of the drying and pyrolysis thereof, the inner diameter of the furnace bottom of the melting furnace portion 4 is generally designed to be smaller than the inner diameter of the shaft portion 2 or the width of the communicated portion 5. In view of this, the dry distillation carbonizing grates 3B may be configured in such a manner that widths thereof are gradually decreased toward the downstream side starting from the upstream side so that the width on the downstream side becomes closer to the inner diameter of an upper-side opening 46 of the melting furnace portion 4 as much as possible. By setting the width of the dry distillation carbonizing grate 3B on the downstream side to be closer to the inner diameter of the melting furnace portion 4 as described above, the narrowing rate of the inverted truncated cone portion 45 can be decreased, thereby preventing the inclination angle θ of the inverted truncated cone portion 45 from being smaller than 75 degrees.

Although both of the supply carbonizing grates 3A and the dry distillation carbonizing grates 3B are illustrated in FIG. 1 as horizontal grates (those obtained by horizontally extending grates), the present invention is not limited thereto. One or both of the supply carbonizing grate 3A and the dry distillation carbonizing grate 3B may be configured as a sloped grate whose front edge side is sloped upwardly. When a furnace with a high waste treatment capacity is designed, it is preferable that both of the supply carbonizing grate 3A and the dry distillation carbonizing grate 3B be horizontal grates whose supplying capacity is greater than that of the sloped grates.

The movable grates of the supply carbonizing grates 3A are configured to be moved by the first drive unit 31a, and the movable grates of the dry distillation carbonizing grates 3B are configured to be moved by the second drive unit 31b. The first and second drive units 31a and 31b are thus arranged so that they can control the driving, stopping, and driving speeds (i.e., supply rates) thereof independent of each other. In this case, a supply rate (V1) of the supply carbonizing grates 3A and a supply rate (V2) of the dry distillation carbonizing grates 3B may be set to be relatively different from or identical to each other. If the supply rates are set to be relatively different from each other, it is preferable that the supply rate (V2) of the dry distillation carbonizing grates 3B be greater than the supply rate (V1) of the supply carbonizing grates 3A. Moreover, it is more preferable that the supply rate (V1) of the supply carbonizing grates 3A be variably controlled with the supply rate (V2) of the dry distillation carbonizing grates 3B being constant.

Although not shown in the figure, the carbonizing grate portion 3 is further configured in such a manner that air can be blown into the furnace from the entire surface thereof through gaps between the grates and/or blowing holes formed in the grates. In other words, the carbonizing grate portion 3 also serves as a blower for blowing air used for drying and pyrolysis into the furnace. A first collecting chamber 32a and a second collecting chamber 32b are respectively disposed on the rear surface side of the supply carbonizing grates 3A and the dry distillation carbonizing grates 3B in order to collect fine carbonized wastes when they are dropped through the gaps between the grates. Blower tubes 33a and 33b are connected to the first collecting chamber 32a and the second collecting chamber 32b, respectively. If air from a blower (not shown) is supplied to the first collecting chamber 32a and the second collecting chamber 32b through the blower tubes 33a and 33b, respectively, air is blown into the furnace through the gaps between the grates and/or the blowing holes formed in the grates. The gaps between the grates and/or the blowing holes formed in the grates are preferably formed with a pitch of 400 mm or smaller, for example. The air supplied from the supply carbonizing grates 3A and the dry distillation carbonizing grates 3B may be at a room temperature or may be preheated to a temperature of 200° C., for example. The preheating of the air may be performed by means of a heat exchange with a high-temperature gas discharged from the furnace gas exhaust port 22, for example.

In the above-described configuration, wastes charged from the waste charging port 21 form a waste-charged layer 100 in the shaft portion 2. The drying and pyrolysis of the wastes proceed by a heat exchange occurred when the air blown into the carbonizing grate portion 3 and the melting furnace portion 4 or the gas generated in the furnace passes through the waste-charged layer 100. Heat generation by the wastes themselves is also utilized for the drying and pyrolysis. The wastes descending through the shaft portion 2 are supplied on the supply carbonizing grates 3A at which the load of the waste-charged layer 100 in the shaft portion 2 is received. The wastes are supplied to the dry distillation carbonizing grates 3B while being further pyrolyzed by the supply carbonizing grates 3A. The wastes, having been further pyrolyzed and carbonized by the dry distillation carbonizing grates 3B, are supplied by being dropped through the upper-side opening 46 of the melting furnace portion 4, thereby forming a charged layer 101 of the carbonized wastes. Cokes as a carbon-based solid fuel are charged into the melting furnace portion 4 through the secondary material charging port 41. The oxygen-enriched air blown through the tuyeres 42 combusts the cokes and the fixed carbons of the wastes at the furnace bottom. Consequently, a high-temperature coke bed 102 is formed at the furnace bottom. The heat of the coke bed 102 melts ashes or non-combustible components contained in the wastes. The high-temperature gas discharged out from the furnace gas exhaust port 22, on the other hand, is emitted after being subjected to waste heat recovery by means of a device such as a boiler and then to a detoxifying treatment.

A blast amount of air to be blown into the furnace from the carbonizing grate portion 3 is adjusted so as to have an oxygen percentage corresponding to 60% or greater of the total amount of oxygen to be blown into the furnace during the operation thereof. More specifically, since it is configured in such a manner that air is blown from the carbonizing grate portion 3 positioned on the upper-stage side in the height direction of the furnace and from the tuyeres 42 positioned on the lower-stage side thereof, the sum of oxygen amounts supplied into the furnace by the respective airs is equal to the total amount of oxygen. The blast amount from the carbonizing grate portion 3 is adjusted in such a manner that the percentage of oxygen from the carbonizing grate portion 3 positioned on the upper-stage side corresponds to 60% or greater of the total supplied amount of oxygen. On the other hand, the blast amount from the tuyeres 42 and/or the oxygen concentration of the oxygen-enriched air are/is adjusted in such a manner that the percentage of oxygen to be supplied to the melting furnace portion 4 is smaller than 40% of the total amount of oxygen.

The blast amount of air to be blown into the furnace from the carbonizing grate portion 3 is as described above. However, flow control valves 34a and 34b may be provided respectively in the blower tubes 33a and 33b respectively connected to the first and second collecting chambers 32a and 32b, for example, and the blast amounts from the supply carbonizing grates 3A and the dry distillation carbonizing grates 3B may be thereby adjusted relatively different from each other depending on a state in the furnace. Alternatively, a common flow control valve may be provided so as to manage the blast amount from the supply carbonizing grates 3A and the dry distillation carbonizing grates 3B in a unified manner.

Figure 3:
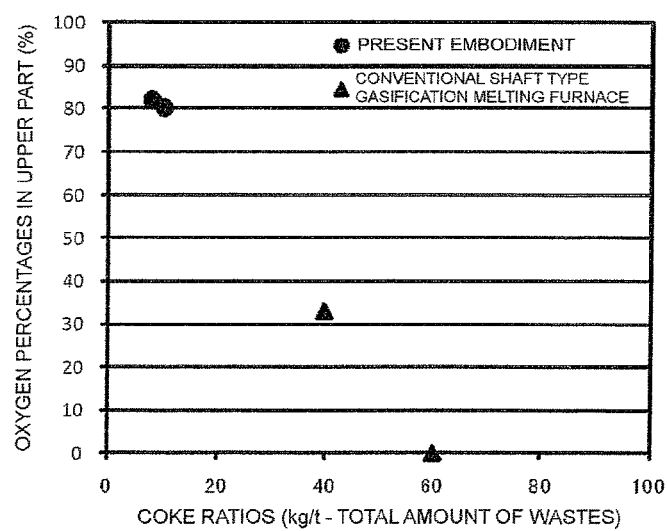
FIG. 3 is a graph showing test results about coke ratios of the waste gasification melting furnace and oxygen percentages in a carbonizing grate portion.

According to the present embodiment, by virtue of the realization of the waste gasification melting furnace 1 capable of setting the percentage of oxygen to be supplied into the furnace from the carbonizing grate portion 3 to be 60% or greater of the total amount of oxygen to be supplied into the furnace, drying and pyrolysis utilizing the combustion heat from the wastes themselves can be facilitated in the shaft portion 2 and the carbonizing grate portion 3. FIG. 3 shows results of an actually-conducted test. A plot ● represents an oxygen percentage (an oxygen percentage in the upper part (%)) to be supplied from the carbonizing grate portion 3 in the present embodiment. A plot ▲ represents, as a comparison, an oxygen percentage (an oxygen percentage in the upper part (%)) to be supplied from an upper-stage tuyere in a conventional shaft type gasification melting furnace. As is apparent from the results of the actually-conducted test shown in FIG. 3, the coke ratio (kg/t–the total amount of wastes) (an amount of cokes used per an amount of wastes treated) can be suppressed to be 20 or smaller according to the present embodiment. In order to more reliably suppress the coke ratio (kg/t–the total amount of wastes) to be 20 or smaller, the oxygen percentage can be set to 70% or greater of the total amount of oxygen. In other words, the consumed amount of cokes for the entire furnace can be significantly reduced as compared to the conventional shaft type melting furnace.

Figure 4:
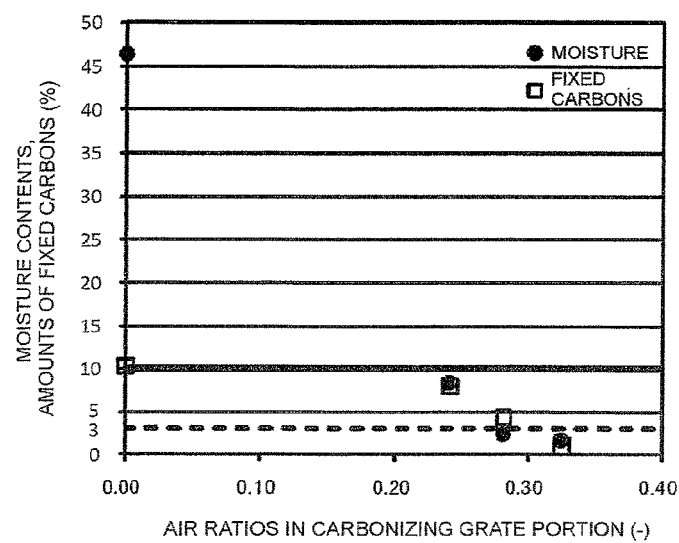
FIG. 4($a$) is a graph showing test results about moisture contents and amounts of residual fixed carbons in wastes having been carbonized in the carbonizing grate portion, and FIG. 4($b$) is a graph showing results about slag temperatures when wastes are melted.
Figure 4:
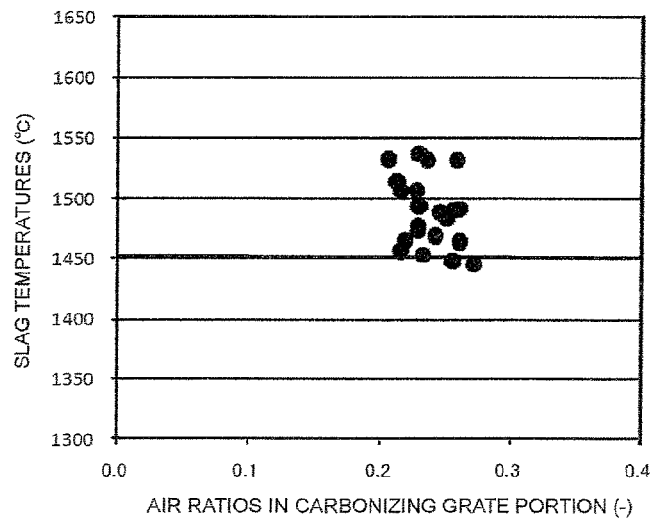

The percentage of the amount of oxygen to be blown into the furnace is as described above. As a further preferable example, an amount of air to be blown into the furnace from the carbonizing grate portion 3 is adjusted in such a manner that a moisture content in the wastes having been dried and pyrolyzed in the shaft portion 2 and further carbonized in the carbonizing grate portion 3 is equal to or smaller than 10% and a remained amount of fixed carbons is equal to or greater than 3%. A moisture content and an amount of fixed carbons contained in wastes before the treatment are not limited to certain values. However, a preferable amount of air suitable for drying, pyrolyzing, and carbonizing a general waste having a moisture content of 45% or greater and an amount of fixed carbons of 10% or greater in order to obtain a moisture content of 10% or smaller and a remained amount of fixed carbons of 3% or greater has an air ratio of 0.2 to 0.3 with respect to a theoretical amount of air as shown by actual test results in FIG. 4($a$). Since moisture and ash contents may be varied depending on types of wastes, the air ratio is adjusted within a range between 0.1 and 0.4.

In other words, the amount of air is set so as to achieve a moisture content of the carbonized wastes of 10% or smaller and a remained amount of fixed carbons thereof of 3% or greater and the blast amount and/or the enriched oxygen concentration from the tuyeres 42 are/is controlled to be low in such a manner that the supplied amount of oxygen corresponding to the set amount of air becomes equal to or greater than 60% of the total supplied amount of oxygen for the entire furnace. Whereas it is desirable that the wastes to be supplied to the melting furnace portion 4 be sufficiently dried, the fixed carbons are gasified if the drying and pyrolysis thereof proceed too much, thereby reducing the combustion heat from the wastes themselves to be utilized for melting. In view of this, by focusing on a suitable balance between the moisture and the residual fixed carbons, a state of wastes suitable for melting has been found out by actually conducting a test. The combustion load at the furnace bottom is thereby reduced and an excessive usage of cokes is therefore reduced. Moreover, it has been confirmed that the slag temperature at the furnace bottom can be kept at a temperature achieving a stable operation (i.e., at 1450° C. or greater) as shown by actual test results in FIG. 4($b$).

Figure 5:
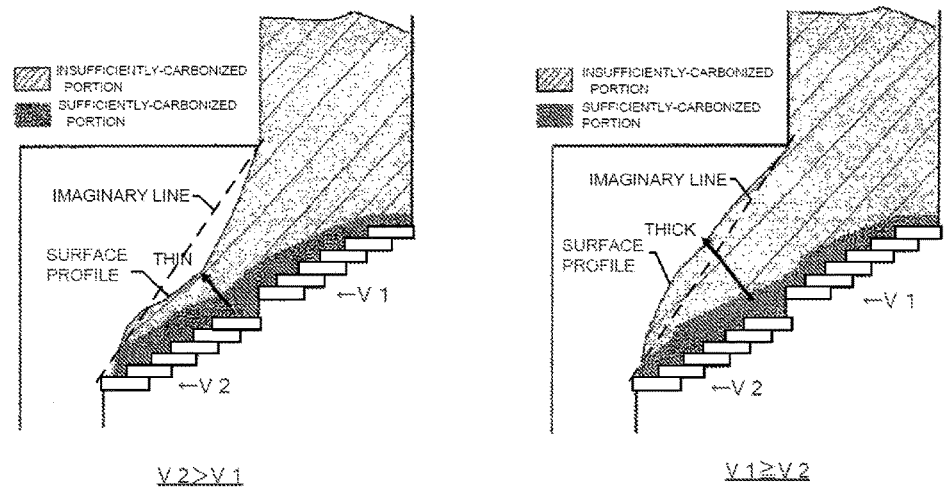
FIG. 5 is a diagram schematically illustrating conditions of wastes being carbonized in the carbonizing grate portion.

Furthermore, if the supply rate (V2) of the dry distillation carbonizing grates 3B is set to be greater than the supply rate (V1) of the supply carbonizing grates 3A, wastes can be dried by distillation at a high dry distillation efficiency. If one seeks to increase the dry distillation efficiency of the carbonizing grate portion 3, the one would typically think that it is preferred to make the wastes retained longer on the dry distillation carbonizing grates 3B, thus setting the supply rate (V2) to be lower than the supply rate (V1). However, with the configuration such that the shaft portion 2 is disposed above the supply carbonizing grates 3A and wastes are supplied by the burden descent, a layer of wastes on the dry distillation carbonizing grates 3B becomes thicker and the wastes around the surface layer thereof, having been insufficiently dried by distillation, are therefore supplied to the melting furnace portion 4 as shown in FIG. 5. In contrast, if the supply rate (V2) of the dry distillation carbonizing grates 3B is set to be greater than the supply rate (V1) of the supply carbonizing grates 3A, the layer of wastes on the dry distillation carbonizing grates 3B can be made thinner, and it is therefore possible to sufficiently perform dry distillation on the carbonizing grates. By giving more weight to the layer thickness than to the retention time as described above, the dry distillation efficiency of the carbonizing grate portion 3 can be improved and the combustion load at the furnace bottom can be thereby reduced more reliably. It is further preferable that an angle ($\alpha$) formed by a horizontal line and a line connecting between the lower end of the shaft portion 2 in the vicinity of the communicated portion 5 and the front edge of the upper surface of the dry distillation carbonizing grate directly above the upper-side opening 46 be set to 50 degrees or smaller as illustrated in FIG. 2. With such a configuration, wastes can be prevented from rushing into the carbonizing grate portion 3 from the shaft portion 2 by virtue of such a repose angle, thereby making it possible to more reliably prevent the layer of wastes on the carbonizing grate portion 3 from being thick.

As mentioned above, the carbonized wastes to be supplied to the melting furnace portion 4 preferably have a moisture content of 10% or smaller and an amount of fixed carbons of 3% or greater in view of the balance between the moisture and the fixed carbons thereof. In order to achieve such a carbonized state, a carbonizing grate combustion rate of the supply carbonizing grates 3A and the dry distillation carbonizing grates 3B preferably falls within a range between 300 kg/(m$^2$·h) and 500 kg/(m$^2$·h). The carbonizing grate combustion rate refers to an amount of wastes treated per unit of time and unit of area. An area of the supply carbonizing grates 3A and that of the dry distillation carbonizing grates 3B are set in such a manner that the carbonizing grate combustion rate falls within a range between 300 kg/(m²·h) and 500 kg/(m²·h). The carbonizing grate combustion rate during the operation of the furnace can be adjusted also by controlling the driving speed of the movable grates, the respective blast amounts and blast temperatures from the carbonizing grates 3A and 3B, and the like in accordance with the drying and pyrolysis state of the wastes.

Figure 6:
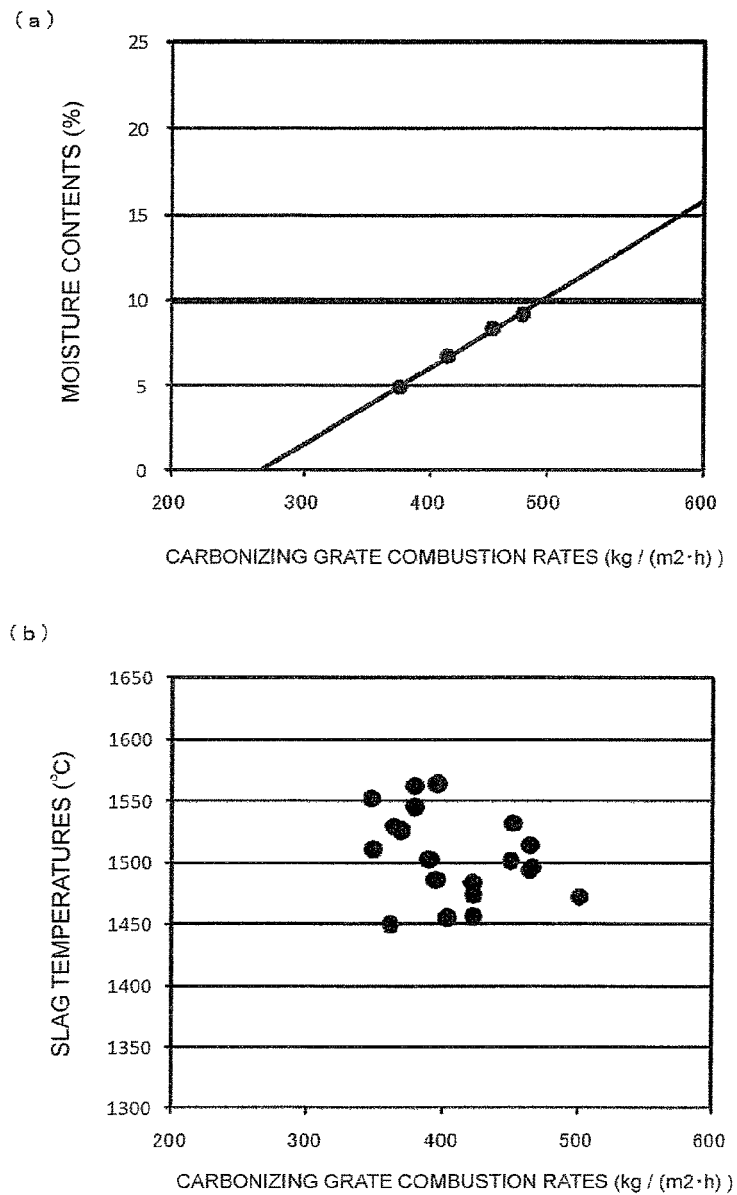
FIG. 6($a$) is a graph showing test results about combustion rates of the carbonizing grate portion and moisture contents of wastes, and FIG. 6($b$) is a graph showing results about slag temperatures when wastes are melted.

If the carbonizing grate combustion rate exceeds 500 kg/(m²·h), the moisture content of the carbonized wastes exceeds 10% as shown by actual test results in FIG. 6(a). Consequently, an excessive combustion load for evaporating the moisture is generated in the melting furnace portion 4. If the carbonizing grate combustion rate is smaller than 300 kg/(m²·h), on the other hand, the fixed carbons of the wastes are gasified along with the proceeding of the combustion thereof whereas the moisture can be evaporated mostly. Thus, the combustion heat cannot be utilized at the furnace bottom of the melting furnace portion 4. It has been also confirmed that the combustion load of the melting furnace portion 4 can be reduced and the slag temperature at the furnace bottom can be kept at a temperature achieving a stable operation (i.e., at 1450° C. or greater) as shown by actual test results in FIG. 6(b) if the carbonizing grate combustion rate is set so as to fall within a range between 300 kg/(m²·h) and 500 kg/(m²·h).

Figure 7:
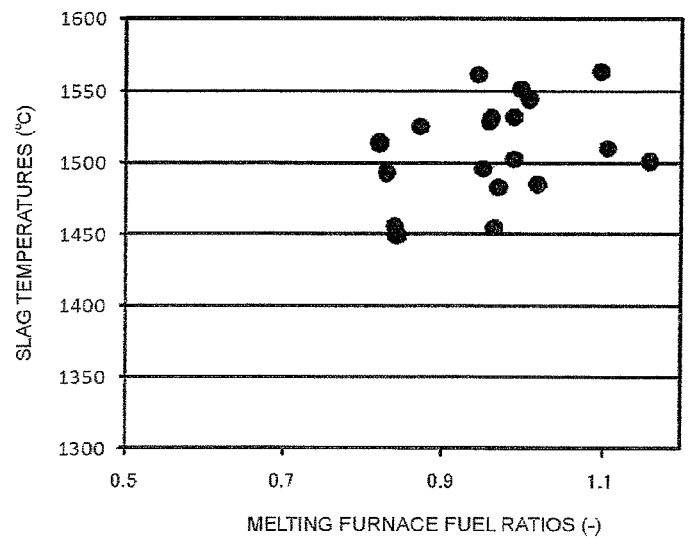
FIG. 7 is a graph showing test results about melting furnace fuel ratios in the waste gasification melting furnace and slag temperatures.

The percentage of oxygen to be supplied into the furnace from the tuyeres 42 is as described above. However, with a value obtained by dividing a theoretical combustion oxygen amount (M1) of fixed carbons contained in the carbon-based solid fuel by a total oxygen amount (M2) of the oxygen-enriched air to be blown into the melting furnace portion 4 from the tuyeres 42 being defined as a melting furnace fuel ratio (M1/M2), it is more preferable that the melting furnace fuel ratio (M1/M2) be kept within a range between 0.8 and 1.2. The melting furnace fuel ratio (M1/M2) is preferably kept within a range between 0.8 and 1.2. The melting furnace fuel ratio (M1/M2) can be adjusted by changing at least one or more of the carbon-based solid fuel to be charged, the blast amount from the tuyeres 42, and the oxygen concentration of the oxygen-enriched air, for example. If the melting furnace fuel ratio (M1/M2) is lower than 0.8, oxygen may be leaked to the communicated portion 5 from the melting furnace portion 4 and the leaked oxygen may react with carbon monoxide existing in the communicated portion 5, resulting in the occurrence of abnormal combustion. Furthermore, oxidation melt clinker may be formed on an inner wall of the furnace. In contrast, if the melting furnace fuel ratio (M1/M2) is greater than 1.2, the carbon-based solid fuel may not be combusted sufficiently at the furnace bottom. If the melting furnace fuel ratio (M1/M2) is kept within a range between 0.8 and 1.2, on the other hand, an amount of the carbon-based solid fuel to be charged and an amount of oxygen to be supplied by the tuyeres 42 can be kept to the minimum necessary. Furthermore, the slag temperature at the furnace bottom can be kept at 1450° C. or greater, at which a stable operation can be achieved, as shown by actual test results in FIG. 7.

Figure 8:
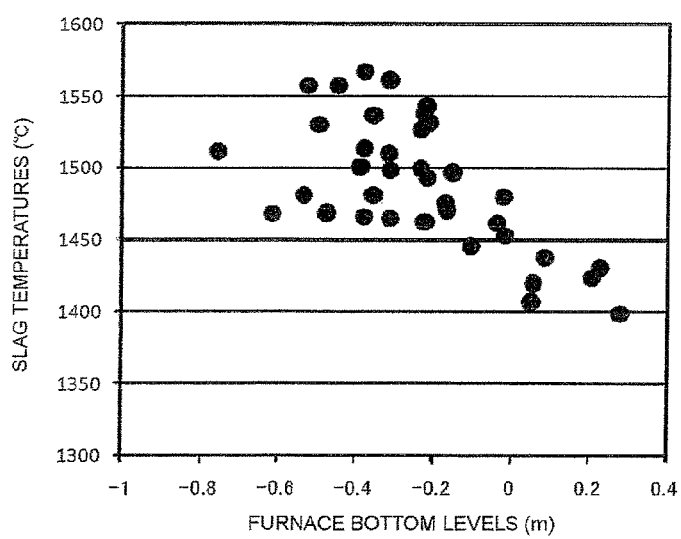
FIG. 8 is a graph showing test results about furnace bottom levels in the waste gasification melting furnace and slag temperatures.

Furthermore, a charged height of wastes in the melting furnace portion 4 during the operation thereof is preferably kept within a range between +0.5 m from the tuyeres 42 in the upward direction and the lowermost end of the carbonizing grate portion 3. By keeping the charged height within such a range, it is possible to suppress oxygen leakage from the furnace bottom due to a reduced thickness of the charged layer 101. It is further possible to prevent a decrease in the pyrolysis efficiency of the carbonizing grate portion 3 resulting from excessive charging or the bridging phenomenon of the charged material in the melting furnace portion 4. Furthermore, as shown by actual test results in FIG. 8, the slag temperature at the furnace bottom can be kept at 1450° C. or greater, at which a stable operation can be achieved (note that furnace bottom levels in FIG. 8 are indicated with the position at the lowermost end of the carbonizing grate portion 3 being defined as the furnace bottom level 0 as shown in FIG. 1).

The control of the waste charged height in the melting furnace portion 4 is performed by adjusting a rate at which the wastes are supplied to the melting furnace portion 4 by the carbonizing grate portion 3, for example. A sensor (not shown) for detecting the height of the charged layer 101 can be disposed in the melting furnace portion 4, for example, and the supply rate of the carbonizing grate portion 3 can be controlled based on the height of the charged layer 101 detected by the sensor. Alternatively, an operator may monitor the charged height, for example, and the supply rate may be controlled based on the monitored result.

Figure 9:
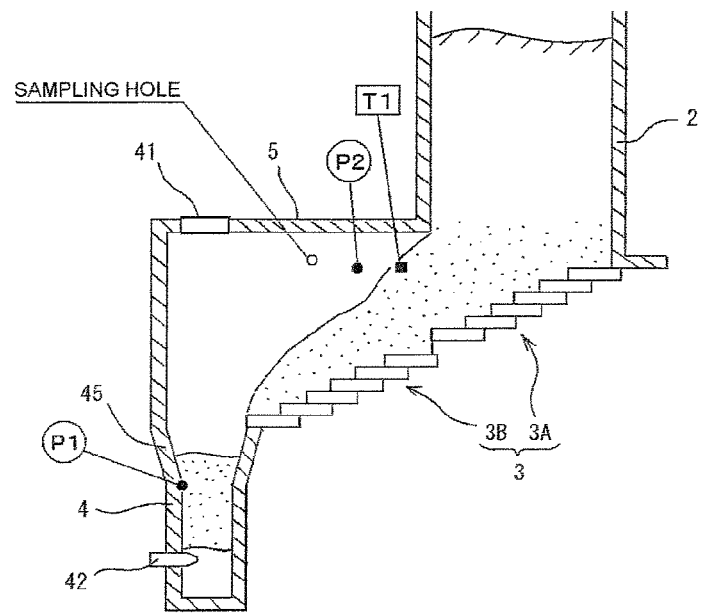
FIG. 9 is a diagram for explaining positions at which a thermometer and pressure gauges of the waste gasification melting furnace are provided.
Figure 10:
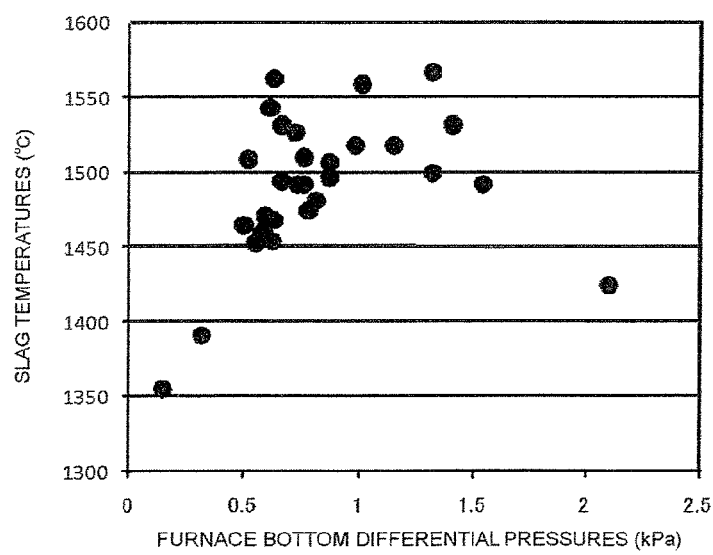
FIG. 10 is a graph showing test results about furnace bottom differential pressures in the waste gasification melting furnace and slag temperatures.

Instead of directly detecting the height of the charged layer 101 as described above, a pressure loss of the charged layer 101 may be detected by means of a pressure gauge and the supply rate of the carbonizing grate portion 3 may be controlled depending on the degree of the pressure loss as means for appropriately controlling the charged height in the melting furnace portion 4 in order to suppress the occurrence of oxygen leakage from the furnace bottom or that of the bridging phenomenon in the charged layer 101. As shown in FIG. 9 by way of an example, a pressure sensor (P1) for detecting a pressure in the melting furnace portion 4 is disposed in the inverted truncated cone portion 45 and a pressure sensor (P2) for detecting a pressure in a space above the carbonizing grate portion 3 is disposed in the communicated portion 5, for example. With a difference between the pressure detected by the pressure sensor (P1) and the pressure detected by the pressure sensor (P2) being defined as a furnace bottom differential pressure, the supply rate of the carbonizing grate portion 3 is controlled in such a manner that the furnace bottom differential pressure is kept within a range between 0.4 and 2 kPa, for example. It is preferred to determine the set value of the furnace bottom differential pressure after verifying in advance a range of a furnace bottom differential pressure corresponding to the preferable charged height by actually operating the furnace. By keeping the furnace bottom differential pressure within such a range, it is possible to suppress the oxygen leakage or the bridging phenomenon. Furthermore, the slag temperature at the furnace bottom can be kept at 1450° C. or greater, at which a stable operation can be achieved, as shown by actual test results in FIG. 10.

Figure 11:
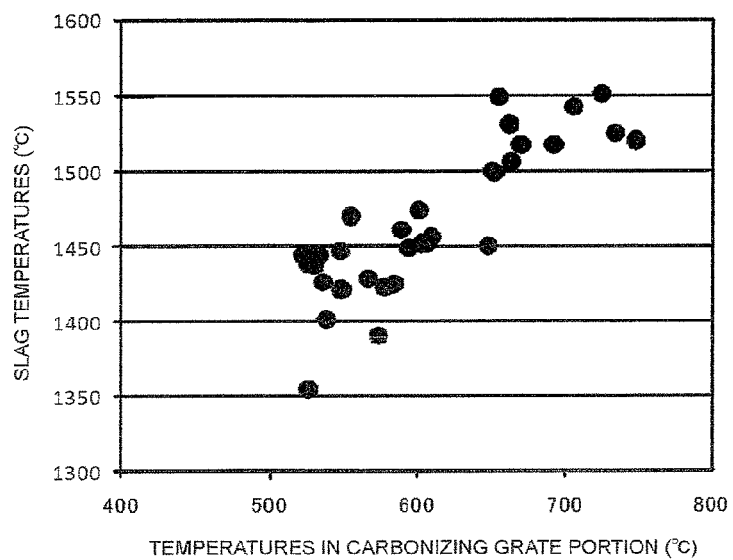
FIG. 11 is a graph showing test results about carbonizing grate portion temperatures in the waste gasification melting furnace and slag temperatures.

Instead of the above-described differential pressure control or together with the differential pressure control, a temperature of the carbonizing grate portion 3 may be detected by means of a thermometer and the supply rate of the carbonizing grate portion 3 may be controlled depending on the temperature of the carbonizing grate portion 3. As shown in FIG. 9 by way of an example, a temperature sensor (T1) for detecting a temperature in an upper space in the vicinity of the boundary between the supply carbonizing grates 3A and the dry distillation carbonizing grates 3B is disposed in the communicated portion 5. The supply rate of the carbonizing grate portion 3 is controlled in such a manner that the temperature detected by the temperature sensor (T1) is kept within a predetermined temperature range, for example, within a range between 650 and 800° C. If the temperature detected by the temperature sensor (T1) exceeds the set range, it is concluded that the amount of heat coming from the melting furnace portion 4 has been increased due to a decrease in the charged level, thus increasing the supply rate. In contrast, if the temperature detected by the temperature sensor (T1) is lower than the set range, it is concluded as excessive charging, thus decreasing the supply rate. It is preferred to determine the set value of the temperature after verifying in advance a temperature range corresponding to the preferable charged height by actually operating the furnace. By keeping the temperature within such a range, it is possible to suppress the oxygen leakage or the bridging phenomenon. Furthermore, the slag temperature at the furnace bottom can be kept at 1450° C. or greater, at which a stable operation can be achieved, as shown by actual test results in FIG. 11. The control by means of the furnace bottom differential pressure can be used in conjunction with the control by means of the temperature of the carbonizing grate portion 3.

Furthermore, the supply rate of the carbonizing grate portion 3 may be controlled also by disposing an ITV camera, capable of monitoring a condition in the vicinity of the front edge of the dry distillation carbonizing grates 3B, in such a manner that a flame in the furnace can be checked as illustrated in FIG. 9, for example. In other words, an appropriate flame condition capable of achieving the slag temperature of 1450° C. or greater at the furnace bottom, for example, is verified in advance. If a flame captured by the ITV camera is smaller than the appropriate flame, it is concluded as excessive charging, thus decreasing the supply rate. In contrast, if the flame is more intense than the appropriate flame, it is concluded that the charged level has been reduced, thus increasing the supply rate.

Furthermore, as illustrated in FIG. 9 for example, a sampling hole for a furnace gas may be provided in the communicated portion 5. A carbon monoxide concentration and an oxygen concentration in the sampled gas may be measured, and the supply rate of the carbonizing grate portion 3 may be controlled in such a manner that the carbon monoxide concentration is kept to be 3% or greater and the oxygen concentration is kept to be 1% or smaller. In other words, if the oxygen concentration is greater than 1%, it is concluded as oxygen leakage resulting from a decrease in the charged level, thus increasing the supply rate. Also, if the carbon monoxide concentration is lower than 3%, it is concluded as a decrease in the dry distillation efficiency resulting from excessive charging, thus decreasing the supply rate.

The description will now be returned to FIG. 1. It is not limited to the configuration in which wastes are charged only from the waste charging port 21 in the upper portion of the shaft. For example, wastes may be charged from the secondary material charging port 41. For example, wastes having a high moisture content may be charged from the waste charging port 21 and may be supplied to the melting furnace portion 4 after being subjected to drying and pyrolysis in the shaft portion 2 and the carbonizing grate portion 3. Wastes having a high ash content and a low moisture content may be charged from the secondary material charging port 41, thereby reducing the load of the drying and pyrolysis in the shaft portion 2 and the carbonizing grate portion 3. An example of the wastes having a high moisture content may be sludge or the like, and an example of the wastes having a high ash content may be incinerated ashes or the like. A waste charging port can be provided also at a position different from the waste charging port 21 and the secondary material charging port 41. By appropriately changing the position at which charging wastes into the furnace is performed depending on the property of wastes as described above, the load for the entire furnace can be reduced.

Kinds of wastes to be treated are not particularly limited, and both of general wastes and industrial wastes can be treated. It is also possible to treat one of shredder residues (ASR), dug wastes, incinerated ashes, and the like, or a mixture thereof, or a mixture of these and a combustible waste. Also, wastes dried by distillation or chars may be charged.

The present invention has been described above in detail in accordance with the specific embodiment thereof. However, it is apparent for a person having ordinal skill in the art that various substitutions, modifications, alternations, and the like regarding its form or details are permissible without departing from the spirit and scope of the present invention as defined by the description of claims. Therefore, the scope of the present invention should not be limited by the above-described embodiment and the accompanying drawings but should be defined based on the description of claims and equivalents thereof.

REFERENCE SIGNS LIST

1 Waste gasification melting furnace
2 Shaft portion
3 Carbonizing grate portion
3A Supply carbonizing grate
3B Dry distillation carbonizing grate
4 Melting furnace portion
42 Tuyere
5 Communicated portion

The invention claimed is:

1. A method comprising,
providing a waste gasification melting furnace comprising:
　a shaft portion configured to dry and pyrolyze wastes charged into the shaft portion, the shaft portion having a waste charging port and a furnace gas exhaust port provided on an upper side of the shaft portion and an opening on a bottom side of the shaft portion for discharging wastes;
　a melting furnace portion arranged in such a manner that a core of the melting furnace is shifted from a core of the shaft portion, the melting furnace portion having, on an upper side of the melting furnace, an opening through which pyrolyzed wastes and a carbon-based solid fuel are supplied, and having, on a furnace bottom side of the melting furnace, a tuyere through which oxygen-enriched air for combustion is blown into the melting furnace portion; and
　a communicated portion configured to connect between the bottom-side opening of the shaft portion and the upper-side opening of the melting furnace portion,
　　wherein the communicated portion includes: a carbonizing grate portion disposed at a position where a load of the wastes charged in the shaft portion is received; a blower configured to blow air used for drying and pyrolysis into the shaft portion from the carbonizing grate portion; and a supply device configured to supply pyrolyzed wastes being on the carbonizing grate portion to the upper-side opening of the melting furnace portion,
　　wherein the carbonizing grate portion includes: a supply carbonizing grate disposed on an upper-stage side of the carbonizing grate portion; and a dry distillation carbonizing grate disposed on a lower-stage side of the carbonizing grate portion, wherein the supply device includes: a first supply device for supplying wastes on the supply carbonizing grate toward the dry distillation carbonizing grate; and a second supply device for supplying carbonized wastes on the dry distillation carbonizing grate toward the melting furnace portion, wherein the first supply device and the second supply device are independent of each other, and wherein the shaft portion is provided directly above the supply carbonizing grate, and treating waste with the waste gasification melting furnace, wherein the waste gasification melting furnace facilitates drying and pyrolysis utilizing combustion heat from wastes themselves in the carbonizing grate portion, wherein the air for drying and pyrolysis is blown into the shaft portion from the carbonizing grate portion in such a manner that the air contains 60% or more of a total amount of oxygen to be blown into the furnace, wherein oxygen delivery supplied from the tuyere in the melting furnace portion is set to be less than 40% of the total amount of oxygen to be blown into the furnace, and wherein a supply rate (V2) of the second supply device is set to be greater than a supply rate (V1) of the first supply device (V2>V1), and wherein, when a line connecting between the lower end of the shaft portion in the vicinity of the communicated portion and the front edge of the upper surface of the dry distillation carbonizing grate directly above the upper-side opening is defined as an imaginary line, a ratio of V1:V2 is set to satisfy the condition that carbonized wastes on the dry distillation carbonizing grate have a surface profile closer to the dry distillation carbonizing grate than the imaginary line.

2. The method according to claim 1, wherein the blower adjusts an amount of air to be blown into the furnace from the carbonizing grate portion in such a manner that a moisture content in wastes supplied from the carbonizing grate portion to the melting furnace portion is equal to or smaller than 10% and a remained amount of fixed carbons is equal to or greater than 3%.

3. The method according to claim 1, wherein the supply rate of the supply device is controlled in such a manner that a waste charged height in the melting furnace portion is kept within a range between +0.5 m from the tuyere in an upward direction and a lowermost end of the carbonizing grate portion.

4. The method according to claim 1, wherein the supply rate of the supply device is controlled in such a manner that a differential pressure between a pressure (P1) in the melting furnace portion and a pressure (P2) in a space above the carbonizing grate portion is kept within a range between 0.4 kPa and 2 kPa.

5. The method according to claim 1, wherein the supply rate of the supply device is controlled in such a manner that a temperature in the carbonizing grate portion is kept within a range between 650° C. and 800° C.

6. The method according to claim 1, wherein with a value obtained by dividing a theoretical combustion oxygen amount (M1) of fixed carbons contained in the carbon-based solid fuel by a total oxygen amount (M2) of the oxygen-enriched air to be blown into the melting furnace from the tuyere being defined as a melting furnace fuel ratio (M1/M2), the melting furnace fuel ratio (M1/M2) is set within a range between 0.8 and 1.2.

7. The method according to claim 1, wherein one or more additional waste charging ports, used for changing a position at which charging wastes into the furnace is performed depending on a kind or property of wastes, are provided at a position different from the waste charging port disposed on the upper portion of the shaft portion.

8. The method according to claim 1, wherein a carbonizing grate combustion rate in the carbonizing grate portion falls within a range between 300 kg/($m^2$·h) and 500 kg/($m^2$·h).

9. The method according to claim 1, wherein the melting furnace portion has a cylindrical shape; an inverted truncated cone portion forming a narrowed portion is formed between the opening through which wastes from the carbonizing grate portion are supplied and the tuyere; and an inclination angle of the inverted truncated cone portion is greater than 75 degrees.

* * * * *